United States Patent
Ota et al.

(10) Patent No.: US 10,373,589 B2
(45) Date of Patent: Aug. 6, 2019

(54) DISPLAY SYSTEM, DISPLAY DEVICE, CONTROLLER, METHOD OF CONTROLLING DISPLAY DEVICE, AND PROGRAM

(71) Applicant: SEIKO EPSON CORPORATION, Tokyo (JP)

(72) Inventors: Koichiro Ota, Omachi (JP); Kazuhiro Miyoshi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 35 days.

(21) Appl. No.: 15/686,909

(22) Filed: Aug. 25, 2017

(65) Prior Publication Data

US 2018/0061370 A1    Mar. 1, 2018

(30) Foreign Application Priority Data

Aug. 31, 2016    (JP) .................................. 2016-169057

(51) Int. Cl.
*G09G 5/36* (2006.01)
*G09G 5/12* (2006.01)
(Continued)

(52) U.S. Cl.
CPC .............. *G09G 5/12* (2013.01); *G06F 3/1423* (2013.01); *G06F 3/1446* (2013.01); *G09G 3/001* (2013.01);
(Continued)

(58) Field of Classification Search
CPC .... G09G 5/38; G09G 5/36; G06T 5/00; G06F 3/14; H04N 5/445; H04N 5/44
See application file for complete search history.

(56) References Cited

U.S. PATENT DOCUMENTS

2003/0126326 A1    7/2003    Nomizo et al.
2004/0046707 A1*   3/2004    Mori .................... G06F 3/1431
                                                                345/1.1
(Continued)

FOREIGN PATENT DOCUMENTS

JP    2003-198994 A    7/2003
JP    2006-287963 A    10/2006
(Continued)

OTHER PUBLICATIONS

Jan. 31, 2018 Extended Search Report issued in European Patent Application No. 17188648.4.

*Primary Examiner* — Pegeman Karimi
(74) *Attorney, Agent, or Firm* — Oliff PLC

(57) ABSTRACT

A display system includes a remote controller that includes a communication unit that transmits operation data to a projector, and an operation unit that receives an operation. The projector includes a remote controller light receiving unit that receives the operation data transmitted from the remote controller, a communication I/F unit that communicates with projectors, and a display unit that displays one setting screen selected from among a plurality of setting screens constituting a hierarchical structure in a case where the display unit is selected as an object to be set by the remote controller. The projector transmits an item identifier indicating a hierarchy of the setting screen being currently displayed to the projectors in a case where a switching instruction for switching an object to be set to the projectors is received from the remote controller during the display of the setting screen.

8 Claims, 10 Drawing Sheets

(51) Int. Cl.
*G06F 3/14* (2006.01)
*G09G 3/00* (2006.01)
*G09G 5/00* (2006.01)
*H04N 9/31* (2006.01)
*H04N 5/44* (2011.01)

(52) U.S. Cl.
CPC ........... *G09G 5/003* (2013.01); *H04N 9/3147* (2013.01); *H04N 9/3182* (2013.01); *G09G 2300/026* (2013.01); *G09G 2320/0606* (2013.01); *G09G 2320/0693* (2013.01); *G09G 2340/14* (2013.01); *G09G 2356/00* (2013.01); *G09G 2360/04* (2013.01); *G09G 2370/025* (2013.01); *H04N 5/4403* (2013.01)

(56) References Cited

U.S. PATENT DOCUMENTS

| | | | |
|---|---|---|---|
| 2006/0161948 A1* | 7/2006 | Hwa | G06F 3/1446 725/37 |
| 2009/0094658 A1* | 4/2009 | Kobayashi | H04N 5/775 725/118 |
| 2010/0097379 A1* | 4/2010 | Choi | G09G 5/363 345/428 |

FOREIGN PATENT DOCUMENTS

| | | |
|---|---|---|
| JP | 2011-81401 A | 4/2011 |
| JP | 2012-019442 A | 1/2012 |

\* cited by examiner

| FIRST HIERARCHY | SECOND HIERARCHY | THIRD HIERARCHY | ITEM IDENTIFIER |
| --- | --- | --- | --- |
| MAIN MENU | | | 1 |
| IMAGE QUALITY | | | 1.1 |
| VIDEO | | | 1.2 |
| SETTING | | | 1.3 |
| | GEOMETRICAL CORRECTION | | 1.3.1 |
| EXTENSION SETTING | | | 1.4 |
| | MULTI-PROJECTION | | 1.4.1 |
| | | EDGE BLENDING | 1.4.1.1 |
| | | COLOR MATCHING | 1.4.1.2 |
| | | BLACK LEVEL ADJUSTMENT | 1.4.1.3 |
| | POWER SAVING SETTING | | 1.4.2 |
| SCHEDULE | | | 1.5 |
| NETWORK | | | 1.6 |
| | BASIC SETTING | | 1.6.1 |
| | WIRELESS LAN | | 1.6.2 |
| | WIRED LAN | | 1.6.3 |
| | NOTICE | | 1.6.4 |
| LENS MENU | | | 2 |

FIG. 3

DISPLAY SYSTEM, DISPLAY DEVICE, CONTROLLER, METHOD OF CONTROLLING DISPLAY DEVICE, AND PROGRAM

CROSS-REFERENCE

The entire disclosure of Japanese Patent Application No. 2016-169057, filed Aug. 31, 2016 is expressly incorporated by reference herein.

BACKGROUND

1. Technical Field

The present invention relates to a display system, a display device, a controller, a method of controlling the display device, and a program.

2. Related Art

In recent years, a system having a plurality of display devices interlocked with each other has been known (see, for example, JP-A-2012-19442). The system disclosed in JP-A-2012-19442 includes a main projector and a sub-projector, and is configured such that switching is performed in the sub-projector in a case where an event such as switching of an input source occurs in the main projector.

When the plurality of display devices are interlocked with each other as disclosed in JP-A-2012-19442, it is possible to easily perform the setting of each of the display devices. However, there may be a case where a setting value or an adjustment value, which is set in one display device, cannot be set for the other display devices as it is such as a case where models of the respective display devices interlocked with each other are different from each other. In this case, it is necessary to individually perform a setting operation for each display device in order to perform setting on the plurality of display devices, which results in troublesome in operation.

SUMMARY

An advantage of some aspects of the invention is to facilitate an operation of performing setting on a plurality of display devices and to reduce a work burden.

An aspect of the invention is directed to a display system including a first display device, a second display device, and a controller, in which the controller includes a first communication unit that communicates with the first display device, and an operation unit that receives an operation, in which the first display device includes a second communication unit that communicates with the controller and the second display device, and a first display unit that displays one setting screen selected from among a plurality of setting screens constituting a hierarchical structure in a case where the first display device is selected as an object to be set by the controller, in which the second display device includes a third communication unit that communicates with the first display device, and a second display unit that displays one setting screen selected from among the plurality of setting screens constituting the hierarchical structure in a case where the second display device is selected as an object to be set by the controller, in which the controller generates setting information regarding setting of the first display device on the basis of an operation received by the operation unit during the display of the setting screen by the first display device to transmit the generated setting information to the first display device by the first communication unit, and generates setting information regarding setting of the second display device on the basis of an operation received by the operation unit during the display of the setting screen by the second display device to transmit the generated setting information to the first display device by the first communication unit, and in which the first display device transmits information indicating a hierarchy of the setting screen being currently displayed to the second display device in a case where a switching instruction for switching an object to be set to the second display device is received from the controller during the display of the setting screen.

According to the aspect of the invention, in a case where the first display device receives the switching instruction from the controller during the display of the setting screen, the first display device transmits the information indicating the hierarchy of the setting screen being currently displayed to the second display device. For this reason, it is possible to designate the setting screen displayed by the first display device with respect to the second display device. For example, in a case where setting is performed on the basis of the setting screen by the first display device, it is possible to perform the setting by displaying the same setting screen also by the second display device. This operation can be easily executed by transmitting the switching instruction from the controller. Therefore, it is possible to facilitate operation in a case where setting is performed on the plurality of display devices and to reduce a work burden.

In the display system according to the aspect of the invention, the first display device may include a first storage unit that stores an identifier table in which a display item displayed on the setting screen and an identifier for specifying the display item are associated with each other, the second display device may include a second storage unit that stores the same identifier table as the identifier table stored in the first storage unit, and the second display device may receive the identifier transmitted as the information indicating the hierarchy of the setting screen from the first display device, may specify the display item associated with the identifier with reference to the second storage unit, and may display the setting screen having the specified display item displayed thereon by the second display unit.

According to the aspect of the invention with this configuration, the first display device and the second display device store the same identifier table, and thus it is possible to specify the display item of the setting screen, being currently displayed by the first display device, in the second display device with a high level of accuracy.

In the display system according to the aspect of the invention, when the second display device is selected as an object to be set and an instruction for changing the setting screen is received from the controller, the first display device may store the identifier of the display item displayed on the changed setting screen in the first storage unit, and may transmit the instruction for changing the setting screen which is received from the controller to the second display device, and in which in a case where a switching instruction for switching an object to be set to the first display device is received from the controller, the first display device may acquire the identifier from the first storage unit, may specify the display item associated with the identifier with reference to the first storage unit, and may display the setting screen having the specified display item displayed thereon by the first display unit.

According to the aspect of the invention with this configuration, it is possible to change the setting screen displayed by the first display device in accordance with instruction for changing the setting screen which is transmitted by the controller. In this case, the identifier of the display item displayed on the setting screen changed by the first display device is stored in the first storage unit. For this reason, even when an object to be set is switched from the second display device to the first display device, it is possible to display the setting screen being currently displayed by the second display device in the first display device. Therefore, it is possible to easily perform the setting of the first display device.

The display system according to the aspect of the invention may further include a plurality of the second display devices, in which the controller may store pieces of identification information for identifying the first display device and the plurality of second display devices in a third storage unit, in which the first display device may store the pieces of identification information for identifying the first display device and the plurality of second display devices in the first storage unit, in which the controller may transmit identification information indicating the first display device or any one of the plurality of second display devices which is selected by the operation received by the operation unit, and the switching instruction to the first display device, and in which in a case where the identification information received from the controller is identification information regarding any one of the plurality of second display devices, the first display device may transmit the identifier acquired from the first storage unit to the second display device specified on the basis of the identification information.

According to the aspect of the invention with this configuration, in a case where the controller selects an object to be set from among the plurality of second display devices, the first display device can transmit the identifier to the second display device selected by the controller.

In the display system according to the aspect of the invention, the third storage unit may store information indicating a relative positional relationship between the first display device and the plurality of second display devices, and in which when the controller receives an operation of designating a specific direction by the operation unit, the controller may specify a display device which is present in the specific direction received by the operation unit with reference to the information indicating the positional relationship on the basis of a position of a display device selected as an object to be set, and may transmit identification information of the specified display device and the switching instruction to the first display device.

According to the aspect of the invention with this configuration, it is possible to select the display device disposed in the specific direction as an object to be set by inputting an operation of designating the specific direction in the operation unit of the controller.

Another aspect of the invention is directed to a display device including a communication unit, a display unit that displays one setting screen selected from among a plurality of setting screens constituting a hierarchical structure, and a control unit that changes setting designated by setting information in accordance with the setting information in a case where the setting information is received by the communication unit during display of the setting screen by the display unit, and transmits information indicating a hierarchy of the setting screen being currently displayed to another display device by the communication unit in a case where an instruction for switching an object to be set to the another display device is received by the communication unit during the display of the setting screen by the display unit.

According to the aspect of the invention, in a case where the display device receives the instruction for switching an object to be set to the another display device during the display of the setting screen, the display device transmits the information indicating the hierarchy of the setting screen being currently displayed to the another display device. For this reason, it is possible to designate a setting screen with respect to the another display device. For example, in a case where setting is performed on the basis of the setting screen by the display device, it is possible to perform the setting by displaying the same setting screen also by the another display device. This operation can be easily realized by transmitting the switching instruction to the display device, and thus it is possible to facilitate operation in a case where setting is performed on the plurality of display devices and to reduce a work burden.

Another aspect of the invention is directed to a controller including a first communication unit that communicates with a first display device, an operation unit that receives an operation, a control unit that selects an object to be set from among the first display device or a plurality of second display devices, and displays one setting screen selected from among a plurality of setting screens constituting a hierarchical structure on the selected display device, and a storage unit that stores pieces of identification information regarding the first display device and the plurality of second display devices, and information indicating a relative positional relationship between the first display device and the plurality of second display devices, in which the control unit specifies a display device, which is selected as an object to be set and which is present in a specific direction received by the operation unit on the basis of a position of a display device currently displaying the setting screen, with reference to the information indicating the positional relationship when receiving an operation of designating the specific direction by the operation unit, and transmits a switching instruction for switching a display device displaying the setting screen to the specified display device and the identification information regarding the specified display device to the first display device.

According to the aspect of the invention, it is possible to select the display device disposed in the specific direction as an object to be set by inputting an operation of designating the specific direction in the operation unit of the controller.

Another aspect of the invention is directed to a method of controlling a display device that includes a communication unit communicating with an external device, the method including displaying one setting screen selected from among a plurality of setting screens constituting a hierarchical structure by a display unit, changing setting of the display device in accordance with setting information regarding the setting of the display device in a case where the setting information is received by the communication unit during the display of the setting screen by the display unit, and transmitting information indicating a hierarchy of the setting screen being currently displayed to another display device by the communication unit in a case where an instruction for switching an object to be set to the another display device is received by the communication unit during the display of the setting screen by the display unit.

According to the aspect of the invention, in a case where the display device receives the instruction for switching an object to be set to the another display device during the display of the setting screen, the display device transmits the information indicating the hierarchy of the setting screen being currently displayed to the another display device. For this reason, it is possible to designate a setting screen with respect to the another display device. For example, in a case where setting is performed on the basis of the setting screen by the display device, it is possible to perform the setting by displaying the same setting screen also by the another display device. This operation can be easily realized by transmitting the switching instruction to the display device, and thus it is possible to facilitate operation in a case where setting is performed on the plurality of display devices and to reduce a work burden.

Another aspect of the invention is directed to a program executable by a computer that controls a display device including a communication unit communicating with an external device, the program causing the computer to execute procedures of displaying one setting screen selected from among a plurality of setting screens constituting a hierarchical structure by a display unit, changing setting of the display device in accordance with setting information regarding the setting of the display device in a case where the setting information is received by the communication unit during the display of the setting screen by the display unit, and transmitting information indicating a hierarchy of the setting screen being currently displayed to another display device by the communication unit in a case where an instruction for switching an object to be set to the another display device is received by the communication unit during the display of the setting screen by the display unit.

According to the aspect of the invention, in a case where the display device receives the instruction for switching an object to be set to the another display device during the display of the setting screen, the display device transmits the information indicating the hierarchy of the setting screen being currently displayed to the another display device. For this reason, it is possible to designate a setting screen with respect to the another display device. For example, in a case where setting is performed on the basis of the setting screen by the display device, it is possible to perform the setting by displaying the same setting screen also by the another display device. This operation can be easily realized by transmitting the switching instruction to the display device, and thus it is possible to facilitate operation in a case where setting is performed on the plurality of display devices and to reduce a work burden.

BRIEF DESCRIPTION OF THE DRAWINGS

The invention will be described with reference to the accompanying drawings, wherein like numbers reference like elements.

FIG. 3 is a diagram illustrating an identifier registration table.

DESCRIPTION OF EXEMPLARY EMBODIMENTS

Hereinafter, embodiments of the invention will be described with reference to the accompanying drawings.

First Embodiment

Figure 1:
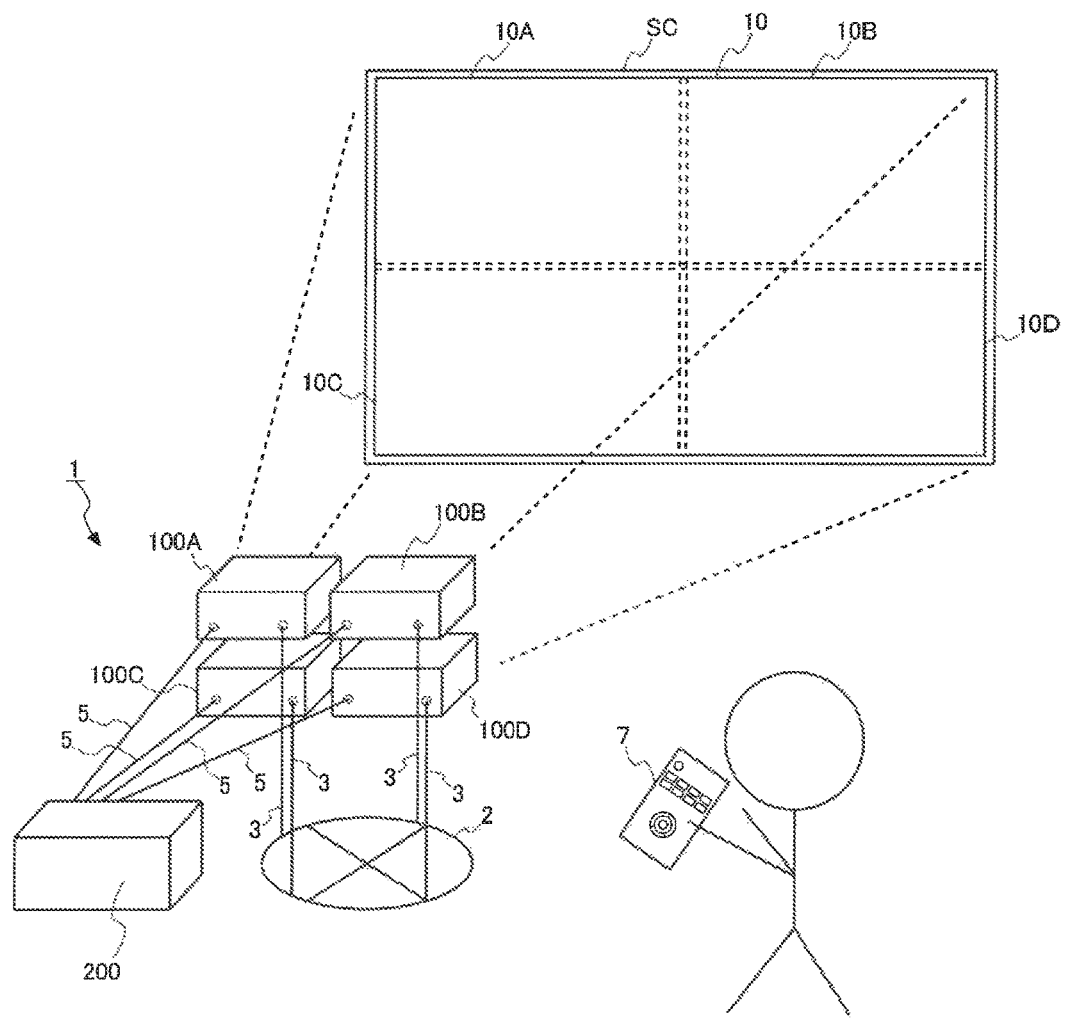
FIG. 1 is a configuration diagram illustrating a system configuration of a display system according to a first embodiment.

FIG. 1 is a configuration diagram illustrating a configuration of a display system 1 according to a first embodiment.

The display system 1 illustrated in FIG. 1 includes a plurality of projectors 100 and an image supply device 200 that supplies image data to the projectors 100, and has a configuration in which these devices are connected to a network 2. The projector 100 is equivalent to a "display device" according to the invention.

FIG. 1 illustrates four projectors of a projector 100A, a projector 100B, a projector 100C, and a projector 100D as the projector 100, but the number of projectors 100 is not limited to four. The four projectors of the projector 100A, the projector 100B, the projector 100C, and the projector 100D will be collectively referred to as the projector 100 when the projectors are not particularly distinguished from each other.

In addition, FIG. 1 illustrates a case where the four projectors 100 are placed flat on a floor or a stand at the front of a screen SC as an object to be projected and are disposed in two rows in the horizontal and vertical directions. In FIG. 1, the projector 100A is disposed on the upper left side toward the paper, and the projector 100B is disposed on the upper right side. In FIG. 1, the projector 100C is disposed on the lower left side toward the paper, and the projector 100D is disposed on the lower right side. The arrangement of the projectors 100A to 100D is not limited to the arrangement illustrated in FIG. 1, and the projectors may be configured to be disposed in one row in the horizontal direction. In addition, a method of installing the projectors 100 is not limited to being placed flat, and can also be hanging installation in which the projectors 100 are suspended from a ceiling or wall-mounted installation in which the projectors are hung on a wall surface.

In addition, FIG. 1 illustrates a case where the projectors 100 projects an image onto the screen SC as an object to be projected, but the object to be projected may be a building or the like.

Among the projectors 100A to 100D constituting the display system 1, one projector 100 operates as a master projector, and the other projectors 100 operate as sub-projectors. In this embodiment, a description will be given of an example of a case where the projector 100A operates as a master projector and the projectors 100B to 100D operate as sub-projectors. The master projector is not required to be the projector 100A, and may be any of the other projectors 100B to 100D. The projector 100A is equivalent to a "first display device" according to the invention. In addition, the projectors 100B to 100D are equivalent to "second display devices" according to the invention.

The display system 1 of this embodiment is set such that operation data transmitted by a remote controller 7 capable of remotely operating the projector 100 is received only by the projector 100A which is the master projector. The remote controller 7 will be described later. The projectors 100B to 100D which are the sub-projectors do not receive the operation data transmitted by the remote controller 7. Alternatively, even when the projectors 100B to 100D receive the operation data, the projectors discard the received operation data or do not execute processing instructed by the operation data. The remote controller 7 is equivalent to a "controller" according to the invention.

The projector 100A which is the master projector executes the processing in accordance with the received operation data in a case where the projector 100 to be operated by the remote controller 7 is set to be the projector 100A. In addition, the projector 100A transmits the received operation data to the projectors 100B to 100D set to be objects to be operated in a case where the projectors 100 to be operated by the remote controller 7 are set to be the projectors 100B to 100D.

The projectors 100A to projector 100D and the image supply device 200 are connected to the network 2 by a communication cable 3 such as a local area network (LAN) cable. The network 2 is a network, such as a LAN constituted based on an Ethernet (registered trademark) standard, which enables bidirectional communication. The network 2 communicably connects the projectors 100A to projector 100D and the image supply device 200 to each other. In this embodiment, a case where the network 2 is constituted by a wired communication line of a LAN will be described, but the network 2 can also be constituted by a wireless communication line such as a wireless LAN.

In addition, the projectors 100A to projector 100D are individually connected to the image supply device 200 by a cable 5 for an image signal such as mobile high-definition link (MHL, registered trademark), HDMI (registered trademark), or DisplayPort.

In this embodiment, a case where the projectors 100 and the image supply device 200 are connected to each other by the wired communication cable 3 is described, but the projectors 100 and the image supply device 200 may be connected to each other by wireless communication such as a wireless LAN or Bluetooth (registered trademark).

An image signal supplied from the image supply device 200 is input to the projectors 100A to 100D. The image supply device 200 is a video output device such as a video reproduction device, a digital versatile disk (DVD) reproduction device, a television tuner device, a set-top box of a cable television (CATV), or a video game device. In addition, a personal computer or the like may be used as the image supply device 200.

An image signal is supplied to each of the projectors 100 from the image supply device 200.

The projectors 100 operate as a multi-projection system that displays images based on the supplied image signals on the screen SC so as to be lined up. An image constituted by the plurality of images lined up on the screen SC is called a tiling image. The images projected from the plurality of projectors 100 are displayed on the screen SC so as to be lined up, and thus it is possible to display the images with high resolution and high luminance which cannot be realized with one projector 100.

In this embodiment, a display region 10 of the screen SC is divided into four regions of display regions 10A, 10B, 10C, and 10D, and images (hereinafter, referred to as projection images) which are projected by the projectors 100 are respectively projected in the display regions 10A to 10D obtained by the division.

In this embodiment, an image projected by the projector 100A is displayed in the display region 10A, and a projection image projected by the projector 100B is displayed in the display region 10B. In addition, a projection image projected by the projector 100C is displayed in the display region 10C, and a projection image projected by the projector 100D is displayed in the display region 10D.

In general, in a case where the projection of a tiling image is performed, the plurality of projectors 100 are disposed adjacent to each other and the projection images projected by the adjacent projectors 100 partially overlap each other.

Figure 2:
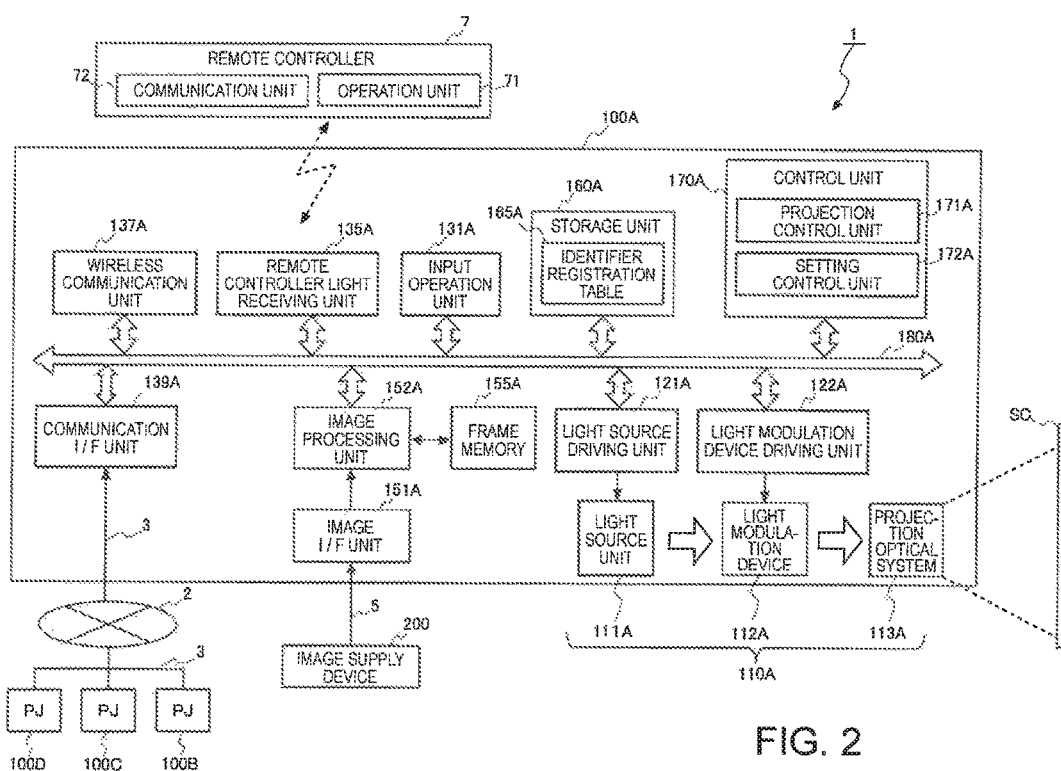
FIG. 2 is a configuration diagram illustrating a system configuration of the display system according to the first embodiment.

FIG. 2 is a configuration diagram of the projector 100A. The projectors 100A to 100D have substantially the same configuration, and thus the configuration of the projector 100A will be representatively described.

The projector 100A includes an image I/F unit 151A. The image I/F unit 151A includes a connector and an interface circuit (both are not shown in the drawing) for the connection of the cable 5, and inputs an image signal supplied from the image supply device 200 connected thereto through the cable 5. The image I/F unit 151A converts the input image signal into image data, and outputs the converted image data to an image processing unit 152A.

The interface included in the image I/F unit 151A of this embodiment is an interface for image data such as MHL, HDMI, or DisplayPort. In addition, the image I/F unit 151A may include an interface for data communication such as Ethernet, IEEE1394, or a USB.

In addition, the image I/F unit 151A may be configured to include a VGA terminal to which an analog video signal is input or a digital visual interface (DVI) to which digital video data is input, as the connector. Further, the image I/F unit 151A includes an A/D conversion circuit, converts an analog video signal into image data by the A/D conversion circuit in a case where the analog video signal is input through the VGA terminal, and outputs the converted image data to the image processing unit 152A.

The projector 100A forms an optical image, and includes a display unit 110A that projects (displays) an image onto the screen SC. The display unit 110A includes a light source unit 111A as a light source, a light modulation device 112A, and a projection optical system 113A. The display unit 110A of the projector 100A is equivalent to a "first display unit" according to the invention. In addition, display units 110B to 110D of the projectors 100B to 100D are equivalent to "second display units" according to the invention.

The light source unit 111A includes a light source such as a xenon lamp, an extra high pressure mercury lamp, a light emitting diode (LED), or a laser light source. In addition, the light source unit 111A may include a reflector and an auxiliary reflector that guide light emitted from the light source to the light modulation device 112A. Further, the light source unit 111A may include a lens group for increasing optical characteristics of projection light, a polarizing plate, a light control element that reduces the amount of light emitted from the light source on a path leading to the light modulation device 112A, or the like (none of which are not shown in the drawing).

The light source unit 111A is driven by a light source driving unit 121A. The light source driving unit 121A is connected to an internal bus 180A. The light source driving unit 121A turns on and turns off the light source of the light source unit 111A under the control of a control unit 170A.

The light modulation device 112A includes, for example, three liquid crystal panels corresponding to three primary colors of RGB. Light emitted by the light source unit 111A is divided into light beams of three color light beams of RGB, and is incident on the corresponding liquid crystal panel. The three liquid crystal panels are transmissive liquid crystal panels, and modulate passing light to generate image light. The image light beams modulated by passing through the respective liquid crystal panels are synthesized by a synthesis optical system such as a cross dichroic prism, and are emitted to the projection optical system 113A.

A light modulation device driving unit 122A driving the liquid crystal panels of the light modulation device 112A is connected to the light modulation device 112A. The light modulation device driving unit 122A is connected to the internal bus 180A.

The light modulation device driving unit 122A generates display image signals of R, G, and B on the basis of display image data (to be described later) which is input from the image processing unit 152A. The light modulation device driving unit 122A drives the corresponding liquid crystal panel of the light modulation device 112A on the basis of the generated display image signals of R, G, and B, and draws an image on each of the liquid crystal panels.

The projection optical system 113A includes a lens group for forming an image on the screen SC by projecting the image light modulated by the light modulation device 112A in a direction of the screen SC. In addition, the projection optical system 113A may include a zooming mechanism performing the enlargement, reduction, and focus adjustment of the projection image on the screen SC, and a focus adjustment mechanism performing focus adjustment.

The projector 100A includes an input operation unit 131A.

The input operation unit 131A includes a plurality of operation keys (not shown) for a user to execute various instructions on the projector 100A. Examples of the operation keys included in the input operation unit 131A include a power supply key for instructing the turn-on and/or turn-off of the projector 100A, a menu key for displaying a menu image for performing various pieces of setting, and the like. In addition, the operation keys include a determination key for fixedly setting an item selected in the menu image or the like, a cross key corresponding to horizontal and vertical directions, and the like. A control unit 170A to be described later controls the projector 100A in accordance with operation contents received by the input operation unit 131A.

The projector 100A includes a remote controller light receiving unit 135A. The remote controller light receiving unit 135A is equivalent to a "second communication unit" according to the invention. The remote controller light receiving unit 135A is connected to the internal bus 180A. The remote controller light receiving unit 135A receives operation data indicating various instructions transmitted from the remote controller 7. The operation data includes a command indicating the contents of an instruction, data indicating the amount of operation received by the cross key or the like of the remote controller 7, and the like.

The remote controller 7 includes a communication unit 72 that transmits the operation data to the projector 100A. The communication unit 72 is equivalent to a "first communication unit" according to the invention. In addition, the remote controller 7 includes an operation unit 71. The operation unit 71 includes a power supply key for switching between the turn-on and turn-off of a power supply, a menu key for displaying a menu image for performing various pieces of setting, a determination key for fixedly setting an item selected in the menu image or the like, a cross key corresponding to horizontal and vertical directions, and the like, as operation keys.

The remote controller 7 includes a "switching key" as an operation key different from the operation keys of the input operation unit 131A. It is possible to switch the projector 100A to be operated by pressing down the switching key.

In addition, the remote controller 7 and the remote controller light receiving unit 135A are configured to be capable of respectively setting a transmission channel and a reception channel. The transmission channel of the remote controller 7 and the reception channel of the remote controller light receiving unit 135A are set to be the same channel, and thus the remote controller light receiving unit 135A can receive the operation data transmitted from the remote controller 7.

In this embodiment, as an example, the remote controller light receiving unit 135A of the projector 100A is set in the same channel as the transmission channel of the remote controller 7. Remote controller light receiving units 135B to 135D of the other projectors 100B to 100D are set in channels different from the transmission channel of the remote controller 7. Alternatively, the remote controller light receiving units 135B to 135D of the other projectors 100B to 100D are set to be in a power-off state, and do not output operation data to control units 170B to 170D in spite of receiving the operation data from the remote controller 7.

A user presses down the switching key when operating the projectors 100B to 100D other than the projector 100A by the remote controller 7.

For example, switching from the projector 100A to be operated to the projector 100B is performed by pressing down the switching key once. When the object to be operated is switched to the projector 100B and operation data is received from the remote controller 7, the control unit 170A of the projector 100A transmits the received operation data to the projector 100B.

The object to be operated is switched from the projector 100B to the projector 100C by pressing down the switching key once more. In addition, the object to be operated is switched from the projector 100C to the projector 100D by pressing down the switching key once more. In addition, the object to be operated is switched from the projector 100D to the projector 100A by pressing down the switching key once more.

When the control unit 170A of the projector 100A receives the operation data from the remote controller 7 and the object to be operated is the projector 100B, the control unit transmits the received operation data to the projector 100B to be operated.

The projector 100A includes a wireless communication unit 137A. The wireless communication unit 137A is connected to the internal bus 180A. The wireless communication unit 137A includes an antenna, a radio frequency (RF) circuit, or the like which is not shown in the drawing, and executes wireless communication with an external device (for example, a tablet terminal to be described in a second embodiment) under the control of the control unit 170A. As a wireless communication method of the wireless communication unit 137A, a short-range wireless communication method such as a wireless LAN, Bluetooth, ultra wide band (UWB), or infrared communication, or a wireless communication method using a mobile phone line can be adopted.

The projector 100A includes a communication I/F unit 139A. The communication I/F unit 139A is equivalent to a "second communication unit" and a "communication unit" according to the invention. In addition, a communication I/F unit 139B to a communication I/F unit 139D of the respective projectors 100B to 100D are equivalent to "third communication units" according to the invention. The communication I/F unit 139A is an interface for performing data communication, and is connected to the communication cable 3 in this embodiment. The communication I/F unit 139A transmits and receives various pieces of data to and from the other projectors 100B to 100D through the communication cable 3 under the control of the control unit 170A.

The projector 100A includes an image processing system. The image processing system is configured centering on the control unit 170A that controls the overall projector 100A, and additionally includes an image processing unit 152A, a frame memory 155A, and a storage unit 160A. The control unit 170A, the image processing unit 152A, and the storage unit 160A are connected to the internal bus 180A. The storage unit 160A is equivalent to a "first storage unit" according to the invention. In addition, storage units 160B to 160D of the respective projectors 100B to 100D are equivalent to "second storage units" according to the invention.

The image processing unit 152A develops image data which is input from the image I/F unit 151A to the frame memory 155A under the control of the control unit 170A. The image processing unit 152A performs image processing such as resolution conversion (scaling), resizing, correction of distortion aberration, shape correction, digital zooming, and adjustment of hue or brightness of an image on the image data developed to the frame memory 155A. The image processing unit 152A performs processing designated by the control unit 170A, and performs the processing by using a parameter which is input from the control unit 170A as necessary. In addition, the image processing unit 152A can also, of course, perform a combination of a plurality of pieces of processing among the above-described pieces of processing.

The image processing unit 152A reads out the processed image data from the frame memory 155A, and outputs the read-out image data to the light modulation device driving unit 122A as display image data.

The storage unit 160A is a non-volatile storage device, and is realized by a storage device such as a flash memory, an erasable programmable ROM (EPROM), an electrically EPROM (EEPROM), or a hard disc drive (HDD).

In addition, the storage unit 160A stores an identifier registration table 165A. FIG. 3 illustrates the identifier registration table 165A. The identifier registration table 165A is equivalent to an "identifier table" according to the invention.

The identifier registration table 165A is a table in which a plurality of menu items and item identifiers for identifying the menu items are registered in association with each other. The item identifier is equivalent to an "identifier" according to the invention. In addition, the menu item is equivalent to a "display item" according to the invention. The plurality of menu items have a hierarchical structure, and is divided into a plurality of hierarchies based on a relationship between higher and lower levels.

For example, a relationship is established in which when a certain menu item in a hierarchy at the highest level is selected, a menu item in a hierarchy lower than the highest hierarchy which is related to the selected menu item can be selected, and when a certain menu item in a hierarchy lower than the hierarchy is selected, a menu item in a hierarchy lower than the hierarchy can be selected. In a case where a plurality of main items at a lower level belong to a menu item at a higher level, these menu items at the lower level are main items with high relevancy in performing operation. For example, in a case where a menu item at a higher level is video adjustment, a menu item at a lower level is an item such as brightness or contrast.

FIG. 3 illustrates an example of a case where a menu item in a first hierarchy is "extension setting", menu items in a second hierarchy are "multi-projection" and "power saving setting", menu items in a third hierarchy are "edge blending", "color matching", and "black level adjustment".

For example, in the "extension setting" which is the menu item in the first hierarchy, "1.4" is set as an item identifier. In addition, for example, in the "multi-projection" and the "power saving setting" which are the menu items in the second hierarchy, "1.4.1" and "1.4.2" are set as item identifiers. In addition, in the "edge blending", the "color matching", and the "black level adjustment" which are the menu items in the third hierarchy, "1.4.1.1", "1.4.1.2", and "1.4.1.3" are set as item identifiers.

The item identifier includes information indicating in which hierarchy a menu item associated therewith is positioned in the hierarchical structure. In addition, the item identifier includes a menu item positioned at a level higher than the menu item having the item identifier allocated thereto, and information for specifying the menu item positioned at the lower level.

For example, the "1.4.1" which is the item identifier of the "multi-projection" and the "1.4.2" which is the item identifier of the "power saving setting" have three-digit numbers separated by periods, and thus it is possible to determine that the item identifiers belong to the same hierarchy (second hierarchy).

In addition, the item identifiers of the "multi-projection" and the "power saving setting" have high-order two-digit numbers "1" and "4" which are common thereto, and thus it is possible to determine that the menu items are menu items belonging to the same menu item "extension setting" (1.4) at the higher level.

In addition, the item identifier of the "edge blending" is "1.4.1.1", the item identifier of the "color matching" is "1.4.1.2", and the item identifier of the "black level adjustment" is "1.4.1.3". The item identifiers "1.4.1.1", "1.4.1.2", and "1.4.1.3" have four-digit numbers separated by periods, and thus it is possible to determine that the item identifiers belong to the same hierarchy (third hierarchy). In addition, the item identifiers have high-order three-digit numbers "1", "4", and "1" which are common thereto, and thus it is possible to determine that the menu items are menu items belonging to the same menu item "multi-projection" (1.4.1) at the higher level.

The projectors 100B to 100D also store identifier registration tables 165B to 165D, respectively. Pieces of information respectively registered in the identifier registration tables 165A to 165D are the same information. That is, the projectors 100A to 100D can specify the same menu item by specifying an item identifier.

The control unit 170A includes hardware such as a CPU, a ROM, and a RAM (none of which are not shown in the drawing). The ROM is a non-volatile storage device such as a flash ROM, and stores a control program and data. The RAM constitutes a work area of the CPU. The CPU develops a control program which is read out from the ROM or the storage unit 160A to the RAM, and executes the control program developed to the RAM to control each unit of the projector 100A.

In addition, the control unit 170A includes a projection control unit 171A and a setting control unit 172A as functional blocks. The functional blocks are realized by the CPU executing the control program stored in the ROM or the storage unit 160A.

The projection control unit 171A adjusts a display mode of an image in the display unit 110A and executes the projection of the image onto the screen SC.

Specifically, the projection control unit 171A controls the image processing unit 152A to perform image processing on image data which is input from the image I/F unit 151A. At this time, the projection control unit 171A may read out a parameter necessary for the processing performed by the image processing unit 152A from the storage unit 160A, and output the read-out parameter to the image processing unit 152A.

In addition, the projection control unit 171A controls the light source driving unit 121A to turn on the light source of the light source unit 111A and adjusts the luminance of the light source. Thereby, the light source emits light, and image light modulated by the light modulation device 112A is projected onto the screen SC by the projection optical system 113A.

The setting control unit 172A stores identification information for identifying the projector 100 selected as an object to be operated in the RAM when the switching key of the remote controller 7 is operated and receives operation data corresponding to the operation of the switching key.

In addition, the setting control unit 172A determines the projector 100 to be operated with reference to the RAM when receiving the operation data from the remote controller 7. For example, it is assumed that the projector 100A is an object to be operated and the operation data received from the remote controller 7 includes data indicating one menu item selected from among a plurality of menu items. In this case, the setting control unit 172A displays a screen (hereinafter, referred to as a menu screen) having the selected menu item displayed thereon on the screen SC.

In a case where the received operation data is data indicating the amount of operation for changing a setting value of a setting item displayed on a setting screen, the setting control unit 172A rewrites the setting value on the basis of the amount of operation. That is, the setting control unit 172A takes out the data indicating the amount of operation from the operation data, and rewrites a setting value of a function corresponding to the taken-out amount of operation on the basis of the data indicating the taken-out amount of operation. Meanwhile, differences between the setting item, the menu item, the setting screen, and the menu screen will be described with reference to FIG. 4.

In a case where the projector 100 to be operated is the other projectors 100B to 100D, the setting control unit 172A transmits the received operation data to the projectors 100B to 100D to be operated.

Figure 4:
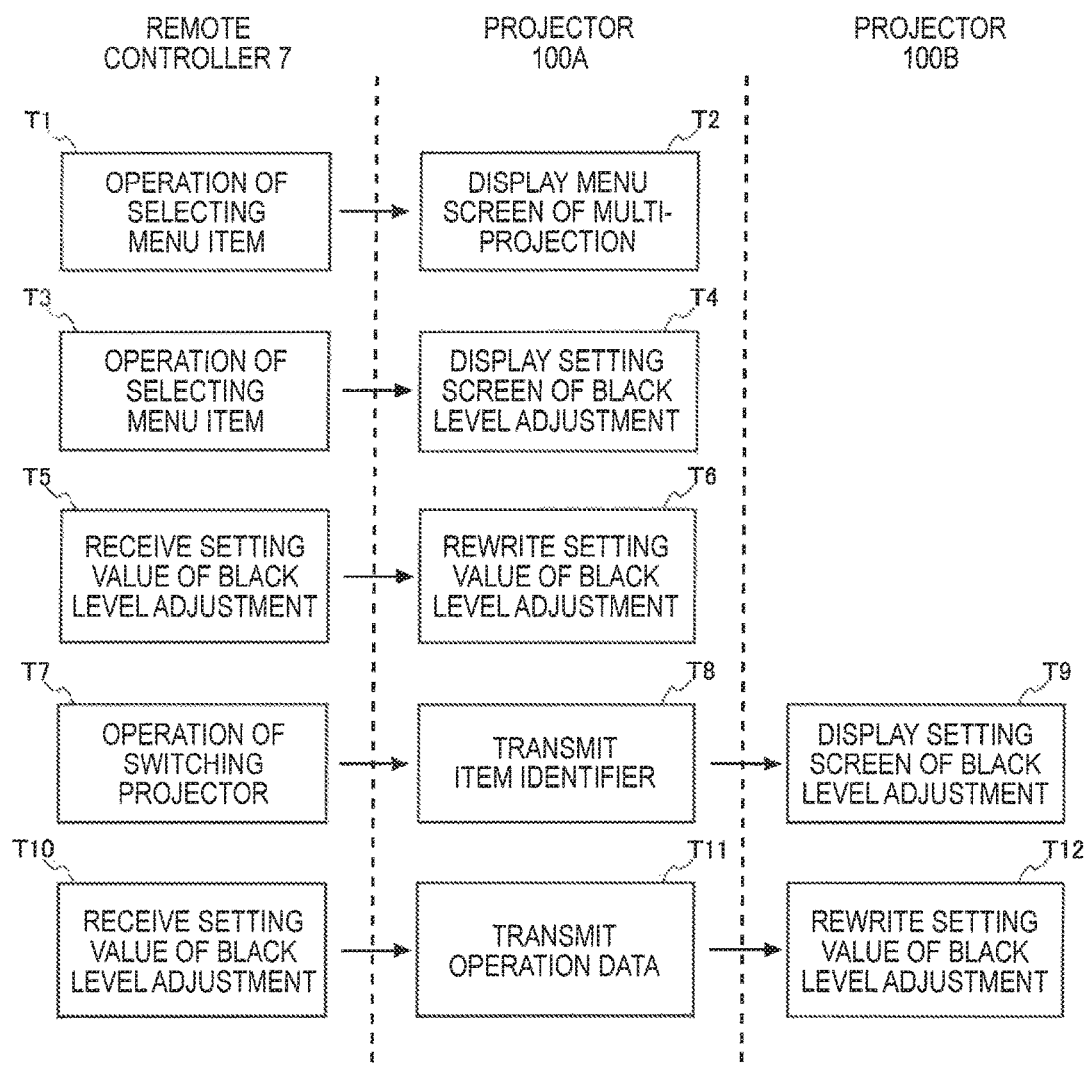
FIG. 4 is a diagram illustrating operation in a case where functions of projectors are set by a remote controller.

FIG. 4 is a diagram illustrating operation in a case where functions of the projectors 100A and 100B are set by the remote controller 7. Meanwhile, in a description of FIG. 4, the description will be given on the assumption that the projector 100 to be operated is first set to be the projector 100A.

FIG. 4 illustrates a case where, for example, the remote controller 7 is operated, and multi-projection of extension setting is selected as a menu item.

When the multi-projection is selected as a menu item (step T1), the setting control unit 172A of the projector 100A displays a menu screen of the multi-projection on the screen SC (step T2). Edge blending, color matching, and black level adjustment, which are menu items in a hierarchy at a level lower than the multi-projection, are displayed on this menu screen.

Next, a user operates the remote controller 7 to select any one of the menu items displayed on the menu screen (step T3). FIG. 4 illustrates a case where the black level adjustment is selected as a menu item.

The remote controller 7 generates information indicating the black level adjustment as a menu item, and transmits the generated information to the projector 100A as operation data. The setting control unit 172A analyzes the operation data received from the remote controller 7, and takes out the information indicating the black level adjustment. The setting control unit 172A displays a setting screen of the black level adjustment on the screen SC on the basis of the taken-out information indicating the black level adjustment (step T4). A setting item for adjusting a black level is displayed on the setting screen. In a case where there are a plurality of setting items for the black level adjustment, a plurality of setting items are displayed on the setting screen.

Here, an installation item and a menu item will be described. In this embodiment, an item for selecting a function for performing setting is a menu item, and an item for setting an actual function such as black level adjustment is referred to as a setting item. The setting item is associated with the menu items in the third hierarchy illustrated in FIG. 3. In addition, a screen having the setting item displayed thereon is referred to as a setting screen, and a screen having the menu items displayed thereon is referred to as a menu screen.

Next, the user operates the cross key or the like of the remote controller 7 to input a setting value of the setting item displayed on the menu screen. When the remote controller 7 receives the input (step T5), the remote controller generates operation data including the designation of the setting item and data indicating the amount of operation for the setting item and transmits the generated operation data to the projector 100A.

The setting control unit 172A of the projector 100A analyzes the operation data received from the remote controller 7, and takes out information for designating the setting item and the data indicating the amount of operation for the setting item. The setting control unit 172A rewrites a setting value of the designated setting item of the black level adjustment on the basis of the taken-out data indicating the amount of operation (step T6).

FIG. 4 illustrates a case where a user performs the black level adjustment of the projector 100A and then performs an operation of changing the projector 100 to be operated from the projector 100A to the projector 100B. The user operates the switching key of the remote controller 7 to switch the projector 100 to be operated from the projector 100A to the projector 100B (step T7). The remote controller 7 generates operation data including information indicating that the switching key has been operated, and transmits the generated operation data to the projector 100A.

The setting control unit 172A of the projector 100A analyzes the operation data received from the remote controller 7, and takes out the information indicating that the switching key has been operated. In a case where the taken-out information is the information indicating that the switching key has been operated, the setting control unit 172A acquires an item identifier for specifying a menu item displayed on a menu screen being currently displayed on the screen SC from the identifier registration table 165A. Here, the setting control unit 172A acquires the item identifier "1.4.1.3" of the black level adjustment from the identifier registration table 165A.

The setting control unit 172 transmits the acquired item identifier "1.4.1.3" to the projector 100B (step T8). The item identifier transmitted to the projector 100B is equivalent to "information indicating a hierarchy".

When the setting control unit 172B of the projector 100B receives the item identifier "1.4.1.3" from the projector 100A, the setting control unit specifies a menu item indicated by the received item identifier with reference to the identifier registration table 165B.

The setting control unit 172B of the projector 100B displays a setting screen including the specified black level adjustment as a setting item on the screen SC (step T9).

The user operates the cross key or the like of the remote controller 7 to input a setting value of the setting item displayed on the setting screen. When the remote controller 7 receives the input (step T10), the remote controller generates operation data including the designation of the setting item and data indicating the amount of operation for the setting item and transmits the generated operation data to the projector 100A.

The setting control unit 172A of the projector 100A transmits the received operation data to the projector 100B because an object to be operated is switched from the projector 100A to the projector 100B (step T11).

The setting control unit 172B of the projector 100B analyzes the operation data received from the remote controller 7, and takes out information for designating the setting item and the data indicating the amount of operation for the setting item. The setting control unit 172B rewrites a setting value of the designated setting item of the black level adjustment on the basis of the taken-out data indicating the amount of operation (step T12).

Figure 5:
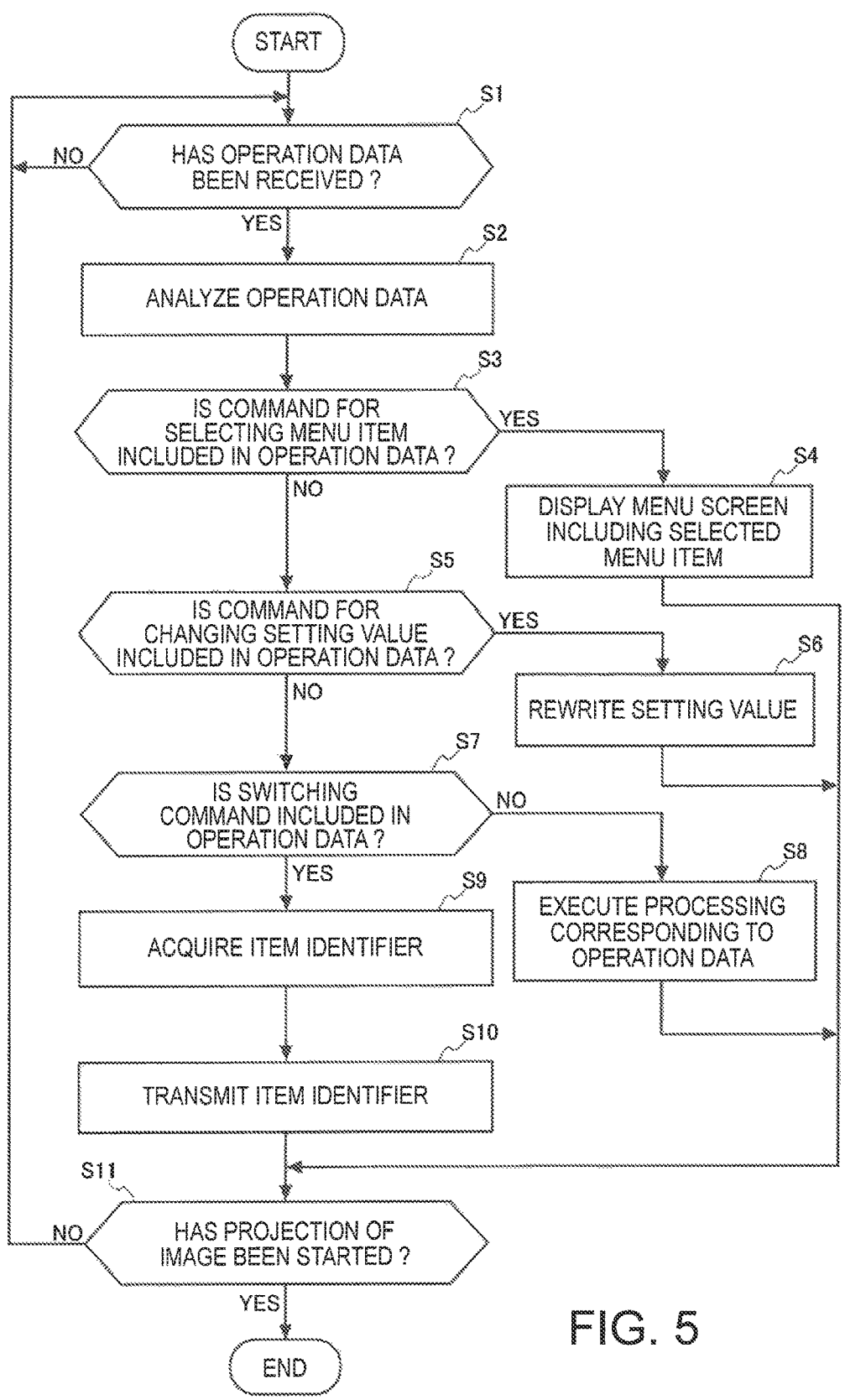
FIG. 5 is a flow chart illustrating the operation of the projector.

FIG. 5 is a flow chart illustrating the operation of the projector 100A.

The control unit 170A first determines whether or not operation data has been received from the remote controller (step S1). In a case where the determination result is negative (step S1/NO), the control unit 170A stands by until receiving the operation data or executes another processing.

In a case where the determination result in step S1 is affirmative (step S1/YES), the control unit 170A analyzes the input operation data (step S2).

The control unit 170A determines whether or not a command for selecting a menu item is included in the operation data as a result of the analysis of the operation data (step S3). In a case where the determination result is affirmative (step S3/YES), the control unit 170A takes out information for designating the menu item from the operation data, and displays a menu screen having the selected menu item displayed thereon on the screen SC on the basis of the taken-out information (step S4).

In a case where the command for selecting the menu item is not included in the operation data (step S3/NO), the control unit 170A determines whether or not a command for changing a setting value for a setting item is included in the operation data (step S5). In a case where the command for changing the setting value is included in the operation data (step S5/YES), the control unit 170 takes out information for designating the setting item and data indicating the amount of operation for the designated setting item from the operation data. The control unit 170A rewrites a setting value of the designated setting item on the basis of the taken-out data indicating the amount of operation (step S6).

In a case where the command for changing the setting value is not included in the operation data (step S5/NO), the control unit 170A determines whether or not a command for switching the projector 100 is included in the operation data (step S7). In a case where the switching command is not included in the operation data (step S7/NO), the control unit 170A executes processing corresponding to another command included in the operation data (step S8).

In a case where the switching command is included in the operation data (step S7/YES), the control unit 170 acquires an item identifier from the projector 100 (referred to as before-switching projector 100) which is selected as an object to be operated before switching (step S9). The control unit 170A acquires an item identifier for specifying a menu item of the menu screen displayed on the screen SC by the before-switching projector 100. In a case where the projector 100A itself is selected as an object to be operated before switching, it is not necessary to perform this processing.

Next, the control unit 170A transmits the acquired item identifier to the projector 100 selected as an object to be operated after switching (step S10). Thereafter, the control unit 170A terminates the setting of functions of the projectors 100A to 100D, and determines whether or not the projection of an image has been started (step S11). In a case where the determination result is negative (step S11/NO), the control unit 170A returns to step S1 and subsequently stands by until receiving the operation data. In a case where the determination result is affirmative (step S11/YES), the control unit 170A terminates this processing flow.

The first embodiment to which the invention is applied as described above includes the projector 100A as a master projector, the projectors 100B to 100D as sub-projectors, and the remote controller 7. The remote controller 7 includes the communication unit 72 that communicates with the projector 100A and the operation unit 71 that receives an operation.

The projector 100A includes the remote controller light receiving unit 135A that communicates with the remote controller 7, and the communication I/F unit 139A that communicates with the projectors 100B to 100D. In a case where an object to be set is selected by the remote controller 7, the projector includes a display unit 110 that displays one setting screen selected from among a plurality of setting screens constituting a hierarchical structure.

The projectors 100B to 100D respectively include the communication I/F units 139B to 139D that communicate with the projector 100A. In a case where an object to be set is selected by the remote controller 7, the projectors respectively include display units 110B to 110D that display one setting screen selected from among a plurality of setting screens constituting a hierarchical structure.

The remote controller 7 generates setting information regarding the setting of the projector 100A on the basis of an operation received by the operation unit 71 while the projector 100A displays the setting screen, and transmits the generated setting information to the projector 100A by the communication unit 72. In addition, the remote controller 7 generates setting information regarding the setting of the projectors 100B to 100D on the basis of an operation received by the operation unit 71 while the projectors 100B to 100D display the setting screen, and transmits the generated setting information to the projector 100A by the communication unit 72.

In this manner, according to the embodiment to which the display system, the display device, the controller, the method of controlling the display device, and the program are applied, the following operational effects are obtained. That is, in a case where the projector 100A receives a switching instruction for switching an object to be set to the projectors 100B to 100D from the remote controller 7 during the display of a setting screen, an item identifier indicating a hierarchy of the setting screen being currently displayed is transmitted to the projectors 100B to 100D. For this reason, it is possible to designate the setting screen displayed by the projector 100A for the projectors 100B to 100D. For example, in a case where setting is performed on the basis of the setting screen by the projector 100A, it is possible to perform the setting by displaying the same setting screen also by the projectors 100B to 100D. This operation can be easily executed by transmitting the switching instruction from the remote controller 7. Therefore, it is possible to facilitate operation in a case where setting is performed on the plurality of projectors 100 and to reduce a work burden.

In addition, the projector 100A includes the storage unit 160A that stores the identifier registration table 165A in which menu items displayed on the setting screen and item identifiers for specifying the menu items are associated with each other.

The projectors 100B to 100D respectively include the storage units 160B to 160D that store the same identifier registration tables 165B to 165D as the identifier registration table 165A stored in the projector 100A.

The projectors 100B to 100D receive an item identifier indicating a hierarchy of the setting screen from the projector 100A, and specify a menu item associated with the item identifier received with reference to the identifier registration tables 165B to 165D. The projectors 100B to 100D display the setting screen having the specified menu item displayed thereon by the display units 110B to 110D.

Therefore, the projectors 100A to 100D store the same identifier registration tables 165A to 165D, and thus it is possible to specify a menu item of a setting screen, being currently displayed by the projector 100A, in the projectors 100B to 100D with a high level of accuracy.

When the projectors 100B to 100D are selected as objects to be set and an instruction for changing a setting screen is received from the remote controller 7, the projector 100A stores an item identifier of a menu item displayed on the changed setting screen in the storage unit 160A. The projector 100A transmits the instruction for changing the setting screen which is received from the remote controller 7 to the projectors 100B to 100D selected as objects to be set.

In a case where the projector 100A receives a switching instruction for switching an object to be set to the projector 100A from the remote controller 7, the projector acquires an item identifier from the storage unit 160A. The projector 100A specifies a menu item associated with the item identifier with reference to the identifier registration table 165A, and displays a setting screen having the specified menu item displayed thereon by the display unit 110A.

Therefore, even when an object to be set is switched from the projectors 100B to 100D to the projector 100A, it is possible to display a setting screen being currently displayed by the projectors 100B to 100D in the projector 100A. For this reason, it is possible to easily perform the setting of a first display device.

Second Embodiment

A second embodiment of the invention will be described.

In the above-described embodiment, the setting of functions of the plurality of projectors 100 are performed by the remote controller 7. In this embodiment, the setting of functions of the plurality of projectors 100 are performed by a tablet terminal 300 instead of the remote controller 7. The tablet terminal 300 is equivalent to a "controller" according to the invention.

Figure 6:
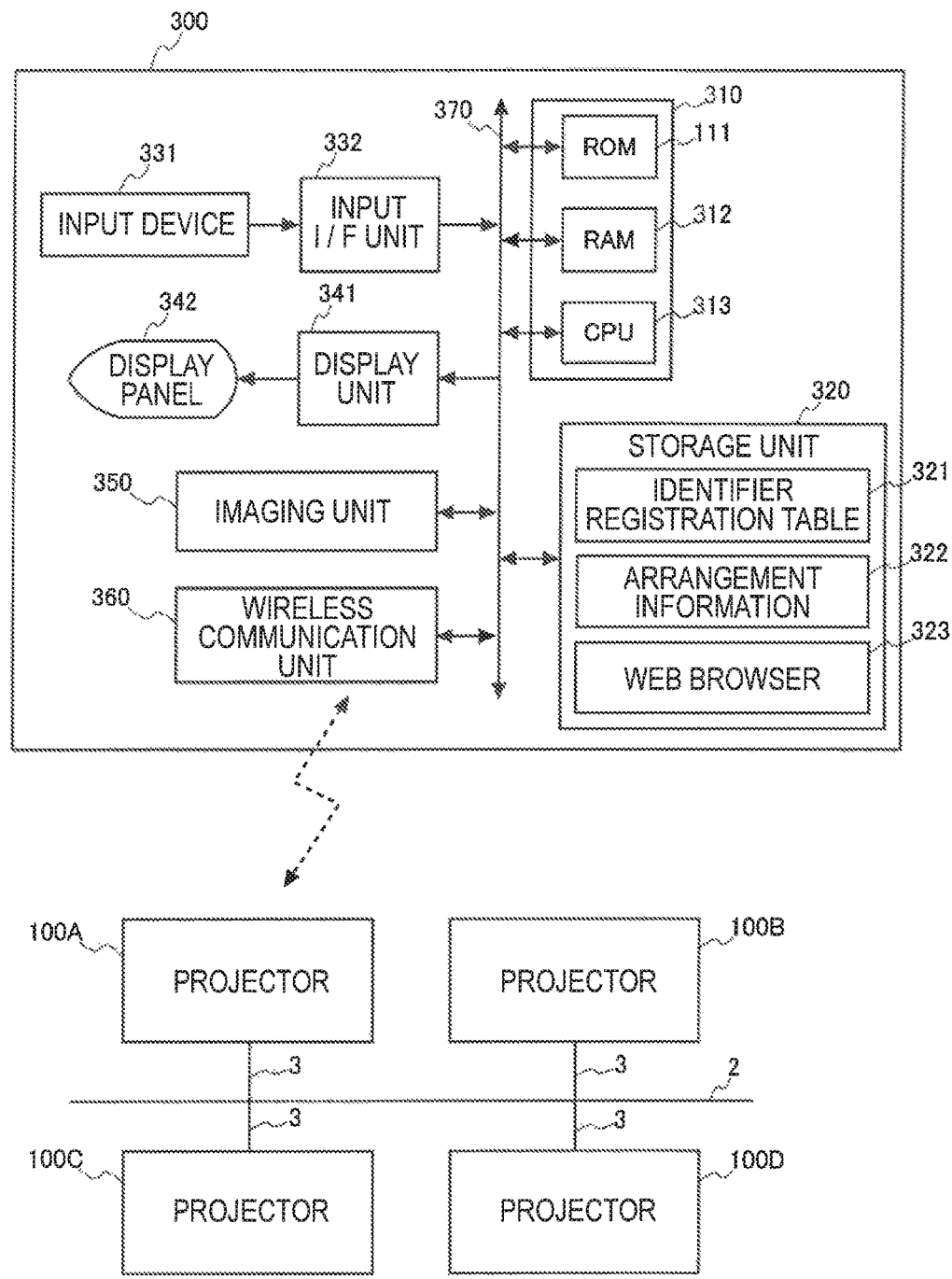
FIG. 6 is a configuration diagram illustrating a system configuration of a display system according to a second embodiment.

FIG. 6 is a diagram illustrating a system configuration of this embodiment.

A configuration of the tablet terminal 300 will be described with reference to FIG. 6.

The tablet terminal 300 includes a control unit 310, a storage unit 320, an input device 331, an input I/F unit 332, a display unit 341, a display panel 342, an imaging unit 350, and a wireless communication unit 360. The control unit 310, the storage unit 320, the input I/F unit 332, the display unit 341, the imaging unit 350, and the wireless communication unit 360 are connected to an internal bus 370. The wireless communication unit 360 is equivalent to a "first communication unit" according to the invention. The storage unit 320 is equivalent to a "third storage unit" according to the invention.

The control unit 310 includes a ROM 311, a RAM 312, and a CPU 313.

The ROM 311 stores a basic control program (operating system: OS) which is executed by the CPU 313 and data in a non-volatile manner. A program of the OS which is read out from the ROM 311 and an application program read out from the storage unit 320 are developed to the RAM 312 by the CPU 313. In addition, the RAM 312 is used as a work area for data processing performed by the CPU 313. The CPU 313 executes the OS and the application program to perform data processing, and controls each unit of the tablet terminal 300.

The storage unit 320 stores the application program executed by the control unit 310 and image data. In addition, the storage unit 320 stores an identifier registration table 321. Pieces of information registered in the identifier registration table 321 and identifier registration tables 165A to 165D are the same information. That is, the tablet terminal 300 and the projectors 100A to 100D can specify the same menu item by specifying an item identifier.

In addition, the storage unit 320 stores arrangement information 322.

Figure 7:
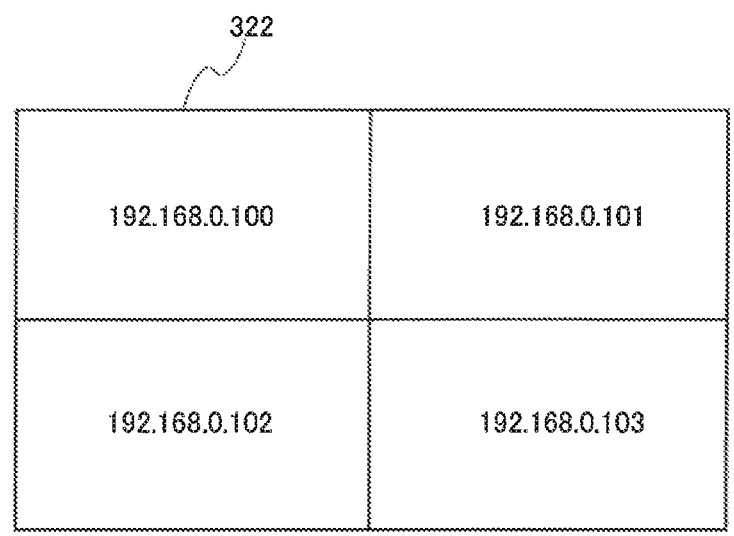
FIG. 7 is a diagram illustrating arrangement information.

FIG. 7 is a diagram illustrating the arrangement information 322. The arrangement information 322 is information in which an IP address of the projector 100 projecting an image is associated with a display position on a screen SC on which each projector 100 projects an image.

That is, the arrangement information 322 is information in which identification information of each projector 100 is associated with a display position of an image projected by each projector 100 on the screen SC, and is information indicating a relative positional relationship between images projected by the respective projectors 100. In addition, the IP address is equivalent to "identification information" according to the invention.

FIG. 7 illustrates the arrangement information 322, for example, in a case where a display region 10 of the screen SC is divided into four regions of the display regions 10A, 10B, 10C, and 10D illustrated in FIG. 1, and the projectors 100A to 100D project images onto the separate display regions 10A to 10D.

It is assumed that an image projected by the projector 100A is displayed in the display region 10A, and an IP address of the projector 100A is "192.168.0.100". In the arrangement information 322, the IP address "192.168.0.100" of the projector 100A is registered in the upper left region corresponding to the display region 10A.

It is assumed that an image projected by the projector 100B is displayed in the display region 10B, and an IP address of the projector 100B is "192.168.0.101". In the arrangement information 322, the IP address "192.168.0.101" of the projector 100B is registered in the upper right region corresponding to the display region 10B.

It is assumed that an image projected by the projector 100C is displayed in the display region 10C, and an IP address of the projector 100C is "192.168.0.102". In the arrangement information 322, the IP address "192.168.0.102" of the projector 100C is registered in the lower left region corresponding to the display region 10C.

It is assumed that an image projected by the projector 100D is displayed in the display region 10D, and an IP address of the projector 100D is "192.168.0.103". In the arrangement information 322, the IP address "192.168.0.103" of the projector 100D is registered in the lower right region corresponding to the display region 10D.

The input device 331 is a keyboard or a pointing device such as a mouse or a digitizer. The input device 331 is equivalent to an "operation unit" according to the invention. The input I/F unit 332 includes a connector or a power supply circuit, and is connected to the input device 331 by the connector. The input I/F unit 332 is constituted by a general-purpose interface for the input device such as a USB interface, detects an operation by the input device 331, and outputs an operation signal based on the detected operation to the control unit 310.

The display unit 341 is connected to the display panel 342, and generates a display signal to display an image on the display panel 342.

A touch sensor detecting a contact with the display panel 342 is superimposed on the display panel 342 so as to be integrally formed. The touch sensor is included in the input device 331. The input I/F unit 332 detects the position of the display panel 342 touched by a user's finger or the like as an input position, and outputs an operation signal corresponding to the detected input position to the control unit 310.

The imaging unit 350 includes a camera including an imaging optical system, an imaging element, an interface circuit, and the like, and generates captured image data under the control of the control unit 310. The imaging unit 350 outputs the generated captured image data to the control unit 310.

The wireless communication unit 360 includes an antenna, an RF circuit, and the like which are not shown in the drawing, and executes wireless communication with an external device (for example, the projector 100A) under the control of the control unit 310. As a wireless communication method of the wireless communication unit 360, a short-range wireless communication method such as a wireless LAN, Bluetooth, UWB, or infrared communication, or a wireless communication method using a mobile phone line can be adopted.

Figure 8:
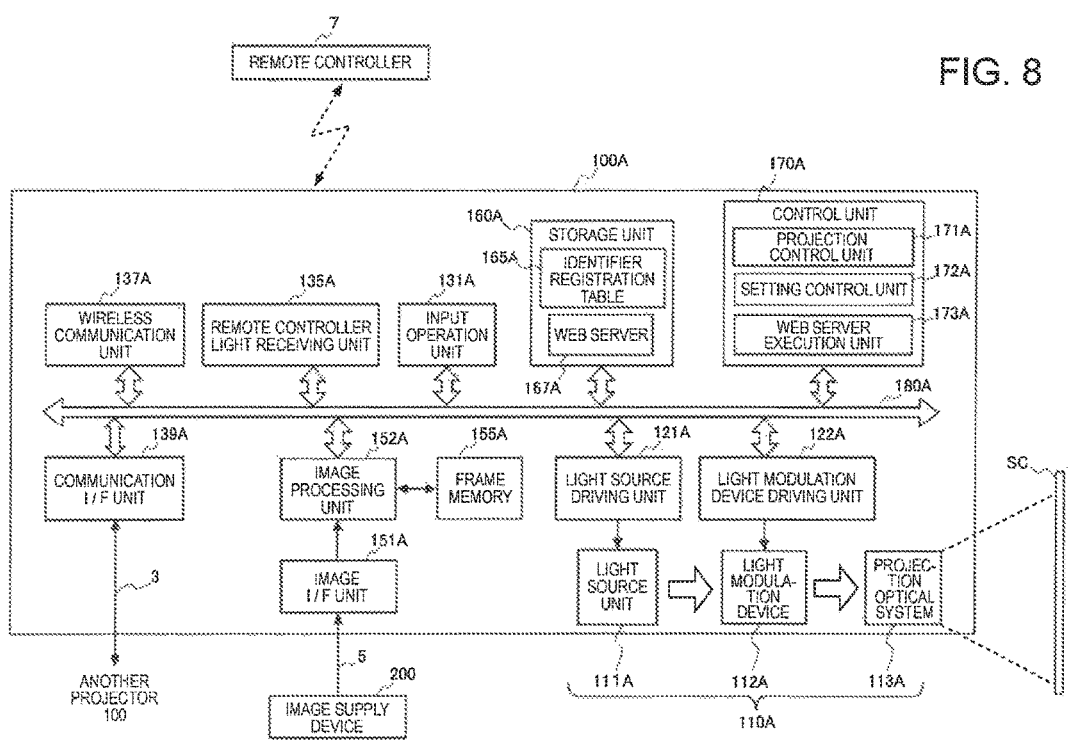
FIG. 8 is a configuration diagram of a projector according to the second embodiment.

FIG. 8 is a configuration diagram illustrating a configuration of the projector 100A according to the second embodiment. Configurations of the projectors 100B to 100D are the same as that of the projector 100A according to the first embodiment described above, and thus the illustration and description thereof will not be repeated.

A control unit 170A of the projector 100A according to the second embodiment further includes a web server execution unit 173A as a functional block. In addition, the storage unit 160A stores a web server 167A.

The web server execution unit 173A executes the web server 167A to perform the transmission and reception of HTML data or the like constituting a web page through a wireless network in response to a request from client software such as a web browser 323.

The control unit 310 of the tablet terminal 300 is connected to a wireless network to which the projector 100A which is a master device is connected, when the web browser 323 is started up.

For example, when the tablet terminal 300 is equipped with functions such as AOSS (registered trademark) and WiFi (registered trademark) protected setup (WPS), the tablet terminal is connected to a wireless LAN access point (not shown) having the projector 100A connected thereto by using these functions. In addition, the tablet terminal 300 and the projector 100A may be directly connected to each other in a wireless manner by using a function such as Wi-Fi Direct of Wi-Fi (registered trademark).

Next, the control unit 310 of the tablet terminal 300 executes the web browser 323 to transmit a request for acquiring an IP address of each of the projectors 100A to 100D connected to a network 2 to the projector 100A.

When the control unit 170A of the projector 100A receives the request for acquiring the IP address, the control unit broadcasts a response request determined in advance. This response request is a predetermined signal for requesting a response from the projectors 100B to 100D which are nodes belonging to the network 2 which is the same network. More specifically, the control unit 170A broadcasts a search command for searching for the projectors 100B to 100D belonging to the network 2, as a response request.

When control units 170B to 170D of the respective projectors 100B to 100D receive the response request, the control units transmit a response command which is a response to the response request to the projector 100A. During this response, the control units 170B to 170D of the respective projectors 100B to 100D also transmit information regarding IP addresses stored in storage units 160B to 160D.

The control unit 170A of the projector 100A transmits the response request and then stands by until receiving a response. When the control unit receives the response (response command), the control unit acquires an IP address included in the received response. The control unit 170A stores the acquired IP addresses of the projectors 100B to 100D and its own IP address in the storage unit 160A. In addition, the control unit 170A transmits the acquired IP addresses and the IP address of the projector 100A itself to the tablet terminal 300.

When the control unit 310 acquires the IP addresses of the respective projectors 100A to 100D connected to the network 2, the control unit associates the acquired IP addresses of the projectors 100 with display positions on the screen SC onto which the projectors 100 project images.

The control unit 310 selects, for example, one of the acquired IP addresses. Meanwhile, the control unit 310 may display the acquired IP addresses on the display panel 342, and may cause the user to select one IP address. That is, the control unit may accept the selection of the IP address by the input device 331.

When the IP address is selected, the control unit 310 transmits the selected IP address and a request for displaying a predetermined image to the projector 100A. This predetermined image is an image for specifying a display position of an image projected by the projector 100 having the IP address on the screen SC. As the predetermined image, an image of a single color such as black or blue can be used. Hereinafter, this predetermined image will be referred to as a position determination image.

The control unit 170A determines whether or not the received IP address is an IP address of the projector 100A itself. In a case where the received IP address is the IP address of the projector 100A itself, the control unit 170A controls the display unit 110A to display a position determination image on the screen SC.

When the position determination image is displayed on the screen SC, the control unit 310 of the tablet terminal 300 specifies a display position of the projector 100 having the selected IP address on the screen SC. For example, the screen SC may be imaged by the imaging unit 350, and the image of the screen SC and the position determination image may be extracted from the captured image data. By this processing, a display position of the projector 100 having the selected IP address on the screen SC may be specified.

In addition, an operation may be performed of causing the user to select a division pattern for dividing the display region 10, displaying figures corresponding to the selected division pattern on the display panel 342 so that the selected IP address is associated with any one of the displayed figures.

Figure 9:
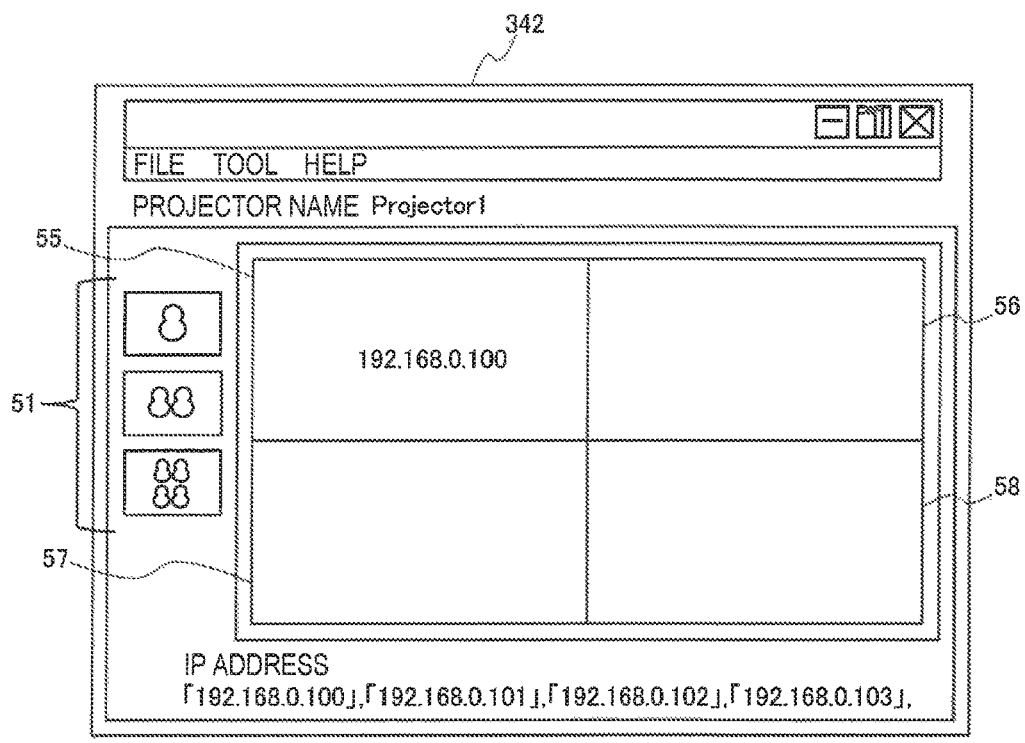
FIG. 9 is a diagram illustrating a setting screen displayed on a display panel of a tablet terminal.

FIG. 9 is a diagram illustrating a setting screen displayed on the display panel 342. This setting screen is a screen of a web page acquired from the web server 167A by the web browser 323.

A plurality of icons 51 for setting the number of regions obtained by dividing the display region 10 are displayed on the setting screen. A user operates the input device 331 to select any one of the icons 51, and thus setting the number of regions obtained by dividing the display region 10. When the user selects the icon 51 to select the number of regions obtained by dividing the display region 10, rectangular FIGS. 55 to 58 of which the number is the same as the selected number of regions obtained by the division are displayed in a setting region 52 of the setting screen. The FIGS. 55 to 58 are figures schematically illustrating the respective separate regions. When the FIGS. 55 to 58 are displayed in the setting region 52, the user associates a selected IP address with any one of the displayed FIGS. 55 to 58 on the basis of a display position of a displayed position determination image on the screen SC.

When the arrangement information 322 is generated, the control unit 310 performs the setting of functions of the respective projectors 100A to 100D. In this embodiment, it is assumed that the projector 100 to be operated which is firstly subjected to the setting of a function is set to be the projector 100A which is a master device.

The user selects a function (menu item) of the projector 100A to be subjected to setting by a touch operation to the display panel 342 or an operation of the input device 331. The control unit 310 transmits operation data including an item identifier of the selected menu item to the projector 100A.

The control unit 170A of the projector 100A takes out the item identifier from the received operation data, and determines the menu item selected by the taken-out item identifier. The control unit 170A displays a menu screen including the determined menu item on the screen SC.

For example, in a case where a menu screen having a setting item displayed thereon is displayed on the screen SC, the control unit 310 receives a touch operation to the display panel 342 or an operation based on the input device 331. The control unit 310 generates data indicating the amount of operation for changing a setting value of the setting item. The control unit 310 transmits operation data including data indicating the generated amount of operation to the projector 100A. The control unit 170A of the projector 100A takes out the data indicating the amount of operation from the received operation data, and rewrites a setting value of the corresponding function.

In a case where the control unit 310 receives a switching operation for switching the projector 100 to be operated, the control unit determines the selected projector 100 on the basis of the received operation and the arrangement information 322.

Figure 10:
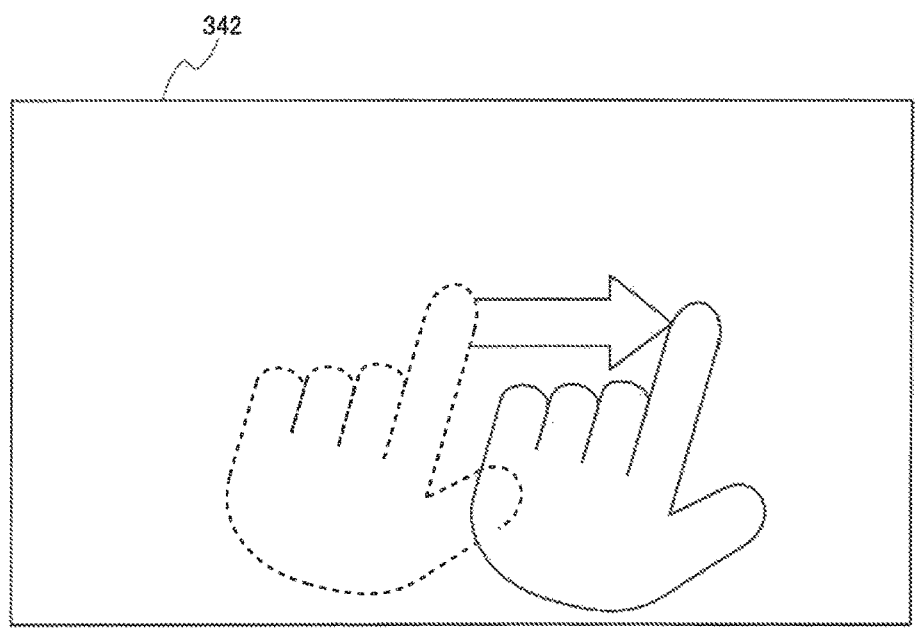
FIG. 10 is a diagram illustrating operation performed on the display panel of the tablet terminal.

FIG. 10 illustrates an operation example in a case where a switching operation for switching the projector 100 to be operated is performed by the tablet terminal 300.

FIG. 10 illustrates a case where a switching operation for switching the projector 100 to be operated is performed by a gesture operation. A user performs a so-called swipe operation of moving a finger touching the display panel 342 in the direction of the display position of the projector 100 desired to be subsequently selected as an object to be operated, on the basis of the display position of the projector 100 currently selected as an object to be operated. This operation is equivalent to an "operation of designating a specific direction" according to the invention.

The control unit 310 of the tablet terminal 300 specifies a direction (hereinafter, referred to as an input direction) which is input by the user, on the basis of a change in a contact position of the user's finger on the display panel 342. When the control unit 310 specifies the input direction, the control unit specifies the projector 100 selected as an object to be operated with reference to the arrangement information 322.

For example, in a case where the projector 100 currently selected as an object to be operated is the projector 100A and a right direction is detected as the input direction, the control unit 310 selects the projector 100B as an object to be operated. In a case where a lower direction is detected as the input direction, the control unit 310 selects the projector 100C as an object to be operated. In a case where a lower right direction is detected as the input direction, the control unit 310 selects the projector 100D as an object to be operated.

Meanwhile, in this embodiment, a gesture operation has been described as a method of a switching operation for switching the projector 100 to be operated, but the method of the switching operation is not limited to the gesture operation. For example, in a case where a menu item in a third hierarchy which is the lowermost layer is selected, the control unit 310 displays an image of a cross key on the display panel 342. Here, the control unit 310 may detect the user's operation for the displayed cross key to select the projector 100 to be operated. In addition, the control unit may detect the input device 331 included in the tablet terminal 300 to select the projector 100 to be operated.

When the projector 100 to be operated is selected, the control unit 310 acquires an IP address of the selected projector 100 with reference to the arrangement information 322. The control unit 310 generates operation data including the acquired IP address and a switching instruction of the projector 100 to be operated, and transmits the generated operation data to the projector 100A.

When the control unit 170A receives the switching instruction and the IP address, the control unit determines that the projector 100 to be operated is switched to the projector 100 indicated by the IP address in response to the received switching instruction. In this case, the control unit 170A stores the IP address in the RAM or the storage unit 160A.

When the control unit 170A of the projector 100A receives operation data from the tablet terminal 300, the control unit transmits the received operation data to the projector 100 having the IP address stored in the RAM or the storage unit 160A.

In a case where the control unit 170A receives operation data including an item identifier as the operation data from the tablet terminal 300 in a state where the projectors 100B to 100D are selected as objects to be operated, the control unit stores the item identifier in the storage unit 160A. In a case where the control unit 170A of the projector 100A receives operation data including the switching instruction and the IP address from the tablet terminal 300, the control unit takes out the item identifier stored in the storage unit 160A and transmits the taken-out item identifier to the projector 100 having the IP address.

Figure 11:
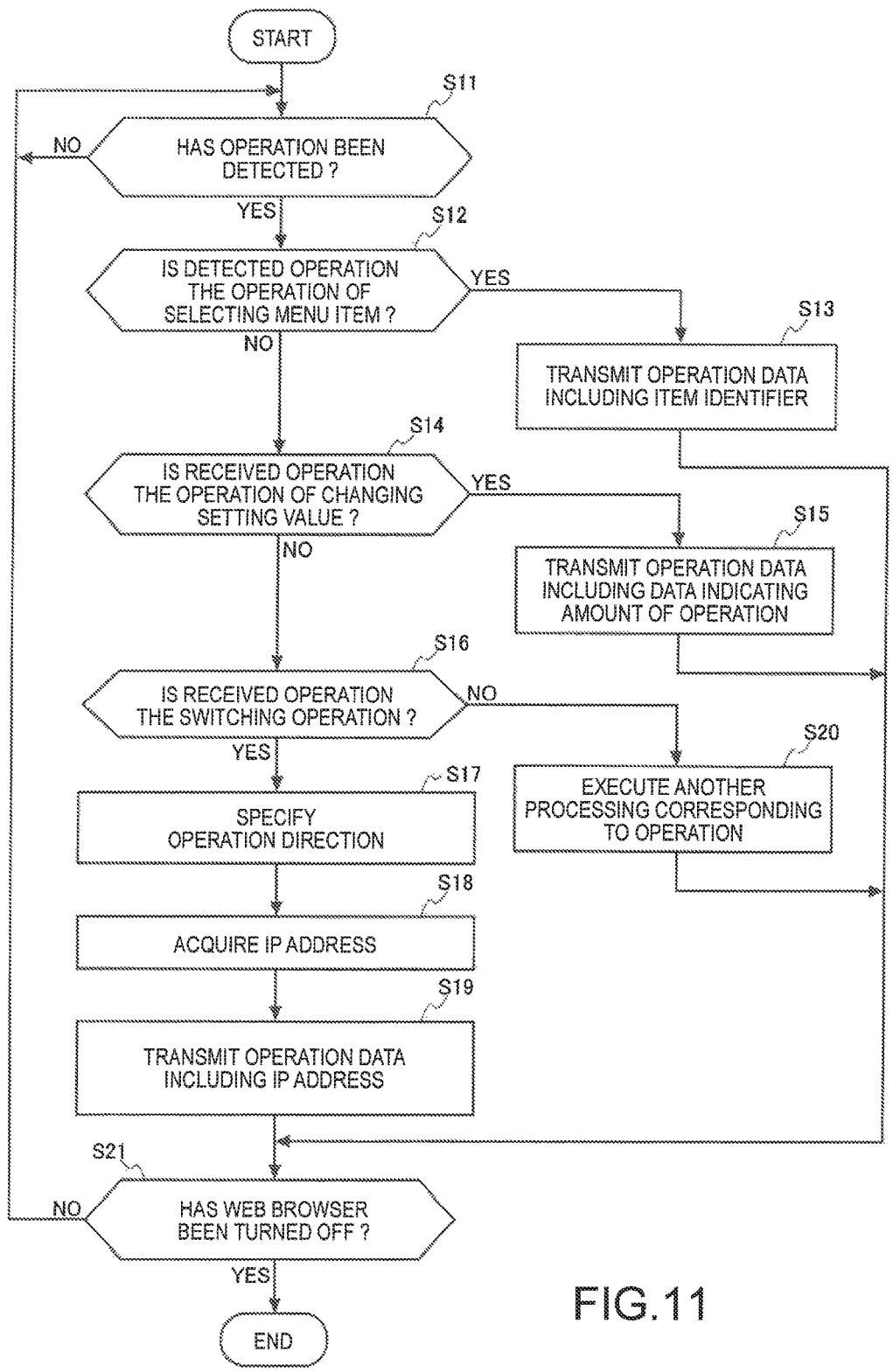
FIG. 11 is a flow chart illustrating the operation of the tablet terminal.

FIG. 11 is a flow chart illustrating the operation of the control unit 310 of the tablet terminal 300.

The control unit 310 determines whether or not a touch operation to the display panel 342 or an operation of the input device 331 has been detected (step S11). In a case where the determination result is negative (step S11/NO), the control unit 310 stands by until an operation is detected.

In a case where an operation has been detected (step S11/YES), the control unit 310 determines whether or not the detected operation is an operation of selecting a menu item (step S12). In a case where the detected operation is an operation of selecting a menu item (step S12/YES), operation data is transmitted (step S13). In detail, in step S13, the control unit 310 acquires an item identifier for specifying the selected menu item with reference to the identifier registration table 321, and transmits operation data including the acquired item identifier to the projector 100A.

In a case where the determination result in step S12 is negative (step S12/NO), the control unit 310 determines whether or not the received operation is an operation of changing a setting value of a setting item (step S14). In a case where the determination result is affirmative (step S14/YES), the control unit 310 generates data indicating the amount of operation of changing the setting value of the setting item on the basis of the received operation. The control unit 310 transmits operation data including the generated data indicating the amount of operation to the projector 100A (step S15).

In a case where the determination result in step S14 is negative (step S14/NO), the control unit 310 determines whether or not the received operation is a switching operation of the projector 100 to be operated (step S16). In a case where the determination result is affirmative (step S16/YES), the control unit 310 specifies an operation direction of the received operation (step S17), and specifies the projector 100 that projects an image in the specified operation direction with reference to the arrangement information 322. The control unit 310 acquires an IP address of the specified projector 100 from the arrangement information 322 (step S18), and transmits operation data including the acquired IP address to the projector 100A (step S19).

In a case where the determination result in step S16 is negative (step S16/NO), the control unit 310 executes another processing corresponding to the received operation (step S20). Thereafter, the control unit 310 determines whether or not the setting of functions of the projectors 100A to 100D has been terminated and the web browser 323 has been turned off (step S21). In a case where the determination result is negative (step S21/NO), the control unit 310 returns to step S11 to subsequently perform the detection of an operation. In a case where the determination result is affirmative (step S21/YES), the control unit 310 terminates this processing flow.

Meanwhile, the operation of the projector 100A according to the second embodiment is substantially the same as the operation illustrated in the flow chart of FIG. 5, and thus a description thereof will not be repeated.

Also in the second embodiment to which the display system, the display device, the controller, the method of controlling the display device, and the program according to the invention are applied, the same effects as in the first embodiment can be obtained.

In addition, the display system 1 according to the second embodiment includes the tablet terminal 300.

The tablet terminal 300 stores IP addresses for identifying the projectors 100A to 100D in the storage unit 320.

The projector 100A stores IP addresses for identifying the projectors 100A to 100D in the storage unit 160A.

The tablet terminal 300 transmits an IP address indicating any one of the projectors 100A to 100D selected by an operation received by the input device 331 and a switching instruction to the projector 100A.

The projector 100A transmits an item identifier acquired from the storage unit 160A to the projectors 100B to 100D specified by the IP address received from the tablet terminal 300. In a case where the IP address received from the tablet terminal 300 is an IP address of any one of the projectors 100B to 100D, the projector 100A may transmit the item identifier acquired from the storage unit 160A.

Therefore, even when the tablet terminal 300 selects an object to be set from among the projectors 100B to 100D, the projector 100A can transmit the item identifier to the projectors 100B to 100D selected by the tablet terminal 300.

In addition, the storage unit 320 of the tablet terminal 300 stores the arrangement information 322 indicating a relative positional relationship between the projectors 100A to 100D.

The tablet terminal 300 may receive an operation of designating a specific direction by a touch operation to the display panel 342. When the tablet terminal 300 receives this operation, the tablet terminal specifies the projectors 100A to 100D that are present in the specific direction with reference to information indicating a positional relationship, on the basis of the positions of the projectors 100A to 100D selected as objects to be set. The tablet terminal 300 transmits IP addresses of the specified projectors 100A to 100D and the switching instruction to the projector 100A. Therefore, it is possible to select the projectors 100A to 100D disposed in the specific direction as objects to be set by inputting an operation of designating the specific direction by the touch operation to the display panel 342.

The first and second embodiments described above are preferred embodiments of the invention. However, the invention is not limited thereto, and various modifications can be made without departing from the scope of the invention.

For example, in the second embodiment described above, a description has been given of a case where the projectors 100A to 100D are connected to the wired network 2, and the tablet terminal 300 and the projector 100A communicate with each other in a wireless manner. The tablet terminal 300 and the projectors 100A to 100D may be connected to each other by a wireless network.

In addition, in the first and second embodiments described above, an example of a configuration in which the setting control unit 172A of the projector 100A transmits an item identifier to the projectors 100B to 100D has been described, but the invention is not limited thereto. For example, in a case where the remote controller 7 stores an item identifier indicating a hierarchy of a setting screen displayed by the projector 100A, the remote controller 7 may transmit the item identifier to the projectors 100B to 100D. In this case, the remote controller 7 may transmit the item identifier indicating the hierarchy of the setting screen displayed by the projector 100A to the projectors 100B to 100D in a case where a switching instruction for switching an object to be set to the projectors 100B to 100D is transmitted to the projector 100A when the projector 100A displays the setting screen.

Further, in a case where a device other than the projector 100A and the remote controller 7 stores the item identifier indicating the hierarchy of the setting screen displayed by the projector 100A, the device may transmit the item identifier to the projectors 100B to 100D. In this case, the device storing the item identifier may transmit the item identifier indicating the hierarchy of the setting screen displayed by the projector 100A to the projectors 100B to 100D in a case where the projector 100A receives the switching instruction for switching an object to be set to the projectors 100B to 100D from the remote controller 7 during the display of the setting screen.

In addition, in the first and second embodiments described above, an example of a configuration using three transmissive liquid crystal panels corresponding to colors of RGB has been described as the light modulation device 112A modulating light emitted from a light source, but the invention is not limited thereto. For example, a configuration using three reflective liquid crystal panels may be adopted, or a system in which one liquid crystal panel and a color wheel are combined with each other may be used. Alternatively, a configuration may be adopted which uses a system using three digital mirror devices (DMDs), a DMD system in which one digital mirror device and a color wheel are combined with each other, or the like. In a case where only one liquid crystal panel or DMD is used as the light modulation device, a member equivalent to a synthesis optical system such as a cross dichroic prism is not necessary. In addition, any light modulation device, other than the liquid crystal panel and the DMD, can be adopted without any problems as long as the light modulation device can modulate light emitted from a light source.

In addition, the functional units of the projectors 100 illustrated in FIGS. 2 and 8 and the tablet terminal 300 illustrated in FIG. 6 show a functional configuration, and a specific embodiment is not particularly limited. That is, hardware individually corresponding to each functional unit is not necessarily required to be mounted, and it is also, of course, possible to adopt a configuration in which functions of a plurality of functional units are realized by one processor executing a program. In addition, a portion of the functions realized by software in the above-described embodiments may be realized by hardware, or a portion of the functions realized by hardware may be realized by software. In addition, detailed specific configurations of the other units of the projectors 100 and the tablet terminal 300 can be arbitrarily changed without departing from the scope of the invention.

In addition, units of the processes of the flow chart illustrated in FIG. 5 are obtained by division in accordance with main processing contents in order to facilitate the understanding of the process of the setting control unit 172A of the projector 100A, and the invention is not limited by a manner in which division in units of the processes is performed and the names thereof. Similarly, units of the processes of the flow chart illustrated in FIG. 11 are obtained by division in accordance with main processing contents in order to facilitate the understanding of the process of the control unit 310 of the tablet terminal 300, and the invention is not limited by a manner in which division in units of the processing is performed and the names thereof.

In addition, the processes of the setting control unit 172A and the control unit 310 can be divided in more units of the processes in accordance with processing contents, and division can be performed such that one unit of a process includes more processes. In addition, the order of the processes of the above-described flow charts is not also limited to the examples shown in the drawing.

What is claimed is:
1. A display system comprising:
a first display device;
a second display device; and
a controller,
wherein the controller includes
a first communication interface that communicates with the first display device, and
operation keys that receive an operation,
wherein the first display device includes
a second communication interface that communicates with the controller and the second display device, and
a first display that displays one setting screen selected from among a plurality of setting screens constituting a hierarchical structure when the first display device is selected as an object to be set by the controller,
wherein the second display device includes
a third communication interface that communicates with the first display device, and
a second display that displays one setting screen selected from among the plurality of setting screens constituting the hierarchical structure when the second display device is selected as the object to be set by the controller,
wherein the controller generates first setting information regarding setting of the first display device on the basis of an operation received by the operation keys during the display of the setting screen by the first display device, the first communication interface transmits the generated first setting information to the first display device, the controller generates second setting information regarding setting of the second display device on the basis of an operation received by the operation keys during the display of the setting screen by the second display device, and the first communication interface transmits the generated second setting information to the first display device, and
wherein the first display device transmits information indicating a hierarchy of the setting screen being currently displayed to the second display device when a switching instruction for switching the object to be set to the second display device is received from the controller during the display of the setting screen.
2. The display system according to claim 1,
wherein the first display device includes a first storage that stores an identifier table in which a display item displayed on the setting screen and an identifier for specifying the display item are associated with each other,
wherein the second display device includes a second storage that stores the same identifier table as the identifier table stored in the first storage unit, and
wherein the second display device receives the identifier transmitted as the information indicating the hierarchy of the setting screen from the first display device, specifies the display item associated with the identifier with reference to the second storage unit, and displays the setting screen having the specified display item displayed thereon by the second display.

3. The display system according to claim 2,
wherein when the second display device is selected as an object to be set and an instruction for changing the setting screen is received from the controller, the first display device stores the identifier of the display item displayed on the changed setting screen in the first storage unit, and transmits the instruction for changing the setting screen which is received from the controller to the second display device, and
wherein when a switching instruction for switching an object to be set to the first display device is received from the controller, the first display device acquires the identifier from the first storage unit, specifies the display item associated with the identifier with reference to the first storage unit, and displays the setting screen having the specified display item displayed thereon by the first display.

4. The display system according to claim 3, further comprising:
a plurality of the second display devices,
wherein the controller stores pieces of identification information for identifying the first display device and the plurality of second display devices in a third storage unit,
wherein the first display device stores the pieces of identification information for identifying the first display device and the plurality of second display devices in the first storage unit,
wherein the controller transmits identification information indicating the first display device or any one of the plurality of second display devices which is selected by the operation received by the operation keys, and the switching instruction to the first display device, and
wherein when the identification information received from the controller is identification information regarding any one of the plurality of second display devices, the first display device transmits the identifier acquired from the first storage to the second display device specified on the basis of the identification information.

5. The display system according to claim 4,
wherein the third storage stores information indicating a relative positional relationship between the first display device and the plurality of second display devices, and
wherein when the controller receives an operation of designating a specific direction by the operation keys, the controller specifies a display device which is present in the specific direction received by the operation keys with reference to the information indicating the positional relationship on the basis of a position of a display device selected as an object to be set, and transmits identification information of the specified display device and the switching instruction to the first display device.

6. A controller comprising:
a first communication interface that communicates with a first display device;
operation keys that receive an operation;
a central processing unit (CPU) programmed to select an object to be set from among the first display device or a plurality of second display devices, and displays one setting screen selected from among a plurality of setting screens constituting a hierarchical structure on the selected display device; and
a storage that stores pieces of identification information regarding the first display device and the plurality of second display devices, and information indicating a relative positional relationship between the first display device and the plurality of second display devices,
wherein the CPU is programmed to specify a display device, which is selected as an object to be set and which is present in a specific direction received by the operation keys on the basis of a position of a display device currently displaying the setting screen, with reference to the information indicating the positional relationship when receiving an operation of designating the specific direction by the operation keys, and transmits a switching instruction for switching a display device displaying the setting screen to the specified display device and the identification information regarding the specified display device to the first display device.

7. A display system comprising:
a first display device;
a second display device; and
a controller,
wherein the controller includes
a first communication interface that communicates with the first display device, and
operation keys that receive an operation,
wherein the first display device includes
a second communication interface that communicates with the controller,
a first display that displays one setting screen selected from among a plurality of setting screens constituting a hierarchical structure when the first display device is selected as an object to be set by the controller,
wherein the second display device includes
a third communication interface that communicates with the first display device, and
a second display that displays one setting screen selected from among the plurality of setting screens constituting the hierarchical structure when the second display device is selected as the object to be set by the controller,
wherein the controller generates first setting information regarding setting of the first display device on the basis of an operation received by the operation keys during the display of the setting screen by the first display device, the first communication interface transmits the generated first setting information to the first display device, the controller generates second setting information regarding setting of the second display device on the basis of an operation received by the operation keys during the display of the setting screen by the second display device, and the first communication interface transmits the generated second setting information to the first display device, and
wherein the second display device receives information indicating a hierarchy of the setting screen being currently displayed by the first display device when the first display device receives a switching instruction for switching the object to be set to the second display device from the controller during the display of the setting screen.

8. A method of controlling a controller, a first display device and a second display device, the controller including a first communication interface and operation keys, the first display device including a second communication interface and a first display, and the second display device including a third communication interface and a second display, the method comprising:

communicating with the first display device via the first communication interface;

receiving, by the operation keys, an operation;

communicating with the controller and the second display device via the second communication interface;

displaying, by the first display, one setting screen selected from among a plurality of setting screens constituting a hierarchical structure when the first display device is selected as an object to be set by the controller;

communicating with the first display device via the third communication interface;

displaying, by the second display, one setting screen selected from among the plurality of setting screens constituting the hierarchical structure when the second display device is selected as the object to be set by the controller;

generating, by the controller, first setting information regarding setting of the first display device on the basis of an operation received by the operation keys during the display of the setting screen by the first display device;

transmitting, by the first communication interface, the generated first setting information to the first display device;

generating, by the controller, second setting information regarding setting of the second display device on the basis of an operation received by the operation keys during the display of the setting screen by the second display device;

transmitting, by the first communication interface, the generated second setting information to the first display device; and transmitting, by the first display device, information indicating a hierarchy of the setting screen being currently displayed to the second display device when a switching instruction for switching the object to be set to the second display device is received from the controller during the display of the setting screen.

\* \* \* \* \*